United States Patent [19]

Lees

[11] 4,301,361
[45] Nov. 17, 1981

[54] DOCUMENT HANDLING DEVICE PROVIDING CHANNELS FOR DOCUMENTS OF TWO WIDTHS

[75] Inventor: Robert Lees, Newark, Del.
[73] Assignee: Autotote, Ltd., Newark, Del.
[21] Appl. No.: 154,939
[22] Filed: May 30, 1980
[51] Int. Cl.³ .......................................... G06K 13/06
[52] U.S. Cl. .................... 235/484; 235/483; 235/475
[58] Field of Search ................ 235/475, 483, 484; 194/4 G; 49/35; 271/238

[56] References Cited

U.S. PATENT DOCUMENTS 3,849,631 11/1974 Meruno ................. 235/484 X

Primary Examiner—Harold I. Pitts
Attorney, Agent, or Firm—John C. Dorfman

[57] ABSTRACT

A movable divider wall means is resiliently supported to extend through a slot opening in a bottom wall and into contact with the top wall so as to define between one of its faces and one of the edges of a channel guide for documents an effective guide for documents of a narrower width defined by the wall and the opposed channel wall. The movable wall has a tapered top edge which tapers from a widely spaced leading edge to the flat top of the movable wall which abuts the top wall and is held into the top wall by resilient means. Documents of greater width may be inserted over the movable wall and passing documents will urge the movable wall downward to displace it and allow their passage. Guide means is preferably provided to direct documents of the second narrower width into the channel at a position after the beginning of the movable wall and from above the movable wall so that they do not tend to move the wall out of its position as they are introduced. In either case, suitable conveyor means pull the documents through the apparatus once they are introduced.

6 Claims, 9 Drawing Figures

DOCUMENT HANDLING DEVICE PROVIDING CHANNELS FOR DOCUMENTS OF TWO WIDTHS

BACKGROUND OF THE INVENTION

The present invention relates to an improvement in document handling devices whereby documents of two widths may be accurately guided into position sensitive apparatus. More specifically, the present invention relates to a highly simplified device providing a document conveying channel which is subdivided by a movable wall permitting passage of wider documents and acting to guide narrower documents.

There are an increasing number of applications in which documents of different widths must be handled by various types of data processing apparatus and in which the apparatus either prints or otherwise places data on the documents or reads data from the documents. It is often desirable to have a single machine handle various documents including those of varying widths. An example of such a use is in parimutuel betting machine wherein hand marked betting requests are normally of a wider width than the printed tickets showing the bets actually placed. Alignment of both documents is critical within the data processing apparatus. Yet it is desirable to use the same apparatus to process documents of both widths.

This problem has been recognized in the patented art in U.S. Pat. No. 4,098,458, issued July 4, 1978, to Richard J. Auchinleck of Peripheral Dynamics, Inc., of Norristown, Pennsylvania. The device of this patent provides a variable width channel by virtue of a rotatable cylindrical member which fits within a cylindrical socket adjacent the conveyor channel which in various rotational positions about its principal axis provides an edge guide wall of different fixed spacing from the other fixed guide wall. Of course, this device must be positioned by some sort of positioning means which senses the width of the document to be introduced, for example, and then turns the movable wall defining means to proper position to present a channel of desired width to accept the document. In addition to the complication of sensing and repositioning of the wall, the system offers the possibility of component failure which may render the device inoperable. In other respects, however, the device is apparently capable of performing well and achieving its desired purpose. Alternative wall means are provided in the structures of FIGS. 4, 5, and 6 which involve several variations on how the wall is formed, but, with the continued problem of supplying some kind of drive to move the wall into an alternative position.

SUMMARY OF THE INVENTION

The present invention is a simpler device which requires no electrical or other powered drive means, and which is failsafe in the sense that it always defines and permits passage of the documents through the broader channel, but whenever wider documents are not in place, the means defining the narrower channel is automatically operatively in place.

More specifically, the present invention concerns a device which employs a moveable wall which passes through a wall defining the top or the bottom of a document guiding channel so that it extends generally parallel to one of the permanent side walls and touches the other of the broad channel defining walls. The movable wall is urged into this wall contacting position by resilient means but the contact of the wall into which it is urged is not complete in that the moveable wall is tapered away from the contacted wall toward the direction from which the documents are inserted. Thus, the document inserted and having wider width than the narrower channel defined in part by the movable wall will pass into the space between the tapered edge and the contacted wall and urge the moveable wall away from the contacted wall as the document is inserted further. Once the document has passed through, the movable wall will return to position, again the contacted wall urged there by the resilient means. Meantime, narrower documents fed in, preferably from a feed opening which guides them into the narrower space defined by the movable wall, are not in a position to move the movable wall, and are, therefore, guided by the wall surface along the narrower channel.

More specifically, the present invention concerns an improvement in a document handling device wherein position of the document is sensitive and at least two widths of documents must be handled. A conveyor channel has upper and lower walls and lateral wall defining means at fixed width to align documents of a first width, fitting snugly within the lateral walls. At least one movable divider wall means extends through one of the upper or lower walls and into contact with the other. The movable divider wall is spaced from and generally parallel to a lateral wall defining means so as to accept and align narrower documents of a second width, fitting snugly therebetween. The divider wall has a leading tapering edge in the direction of document movement over the wall providing a decreasing space between the wall with which it is in contact away from the document insertion end of the channel. Resilient means urges the movable divider wall into the wall with which it makes contact and yields to documents passing over the leading tapered edge of the movable wall. Conveyor means engages a document inserted into the channel and pulls the document through the channel while maintaining position of the document relative to at least one lateral wall defining the channel.

BRIEF DESCRIPTION OF THE DRAWING

For a better understanding of the present invention, reference is made to the drawings in which:

It will be noted that the structure shown in all of the figures is the same and, therefore, corresponding parts have similar designator numbers. However, the difference which exists is in the width of the documents being inserted. In FIGS. 1 through 4, a narrower document 10 is shown. In FIGS. 5 through 8, a wider document 12 is shown.

DESCRIPTION OF THE PREFERRED EMBODIMENT

Figure 1:
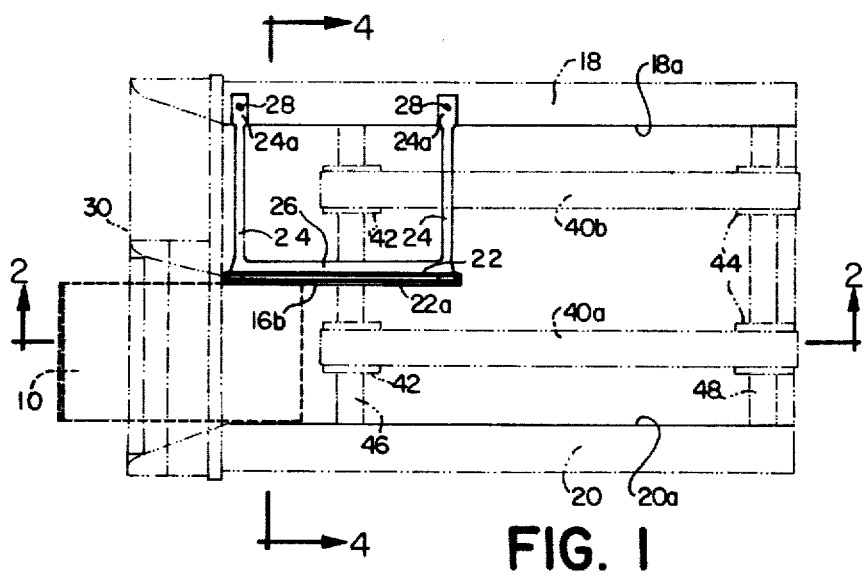
FIG. 1 is a plan view from above showing the document handling device of the present invention with a ticket of narrower width in position.

In accordance with the present invention, the structure provided is part of a document handling device in which the position of the document is sensitive. For example, the document may be printed in some precision fashion, or it may be read by a document reader, and its position must be held accurately indexed to an edge of the document. In order to handle the document, a shallow conveyor channel is provided having upper wall defining means 14 and lower wall defining means 16, as, seen in FIGS. 2 and 6. The lower surface 14a of upper wall defining member 14 provides the upper bounding wall of the channel whereas the upper surface 16a of the lower wall defining structure provides the lower wall of the channel. The spacing between these walls may provide more tolerance than is suggested by the drawings in order to give clearance for documents of varying thickness. The lateral structure 18 and 20 provide inside opposed surfaces 18a, 20a, sufficiently widely spaced apart to snugly accommodate the document of wider width to be handled by the system.

Figure 2:
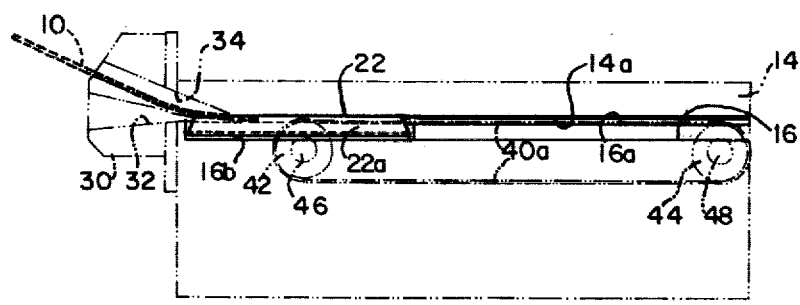
FIG. 2 is a sectional view taken along line 2—2.
Figure 5:
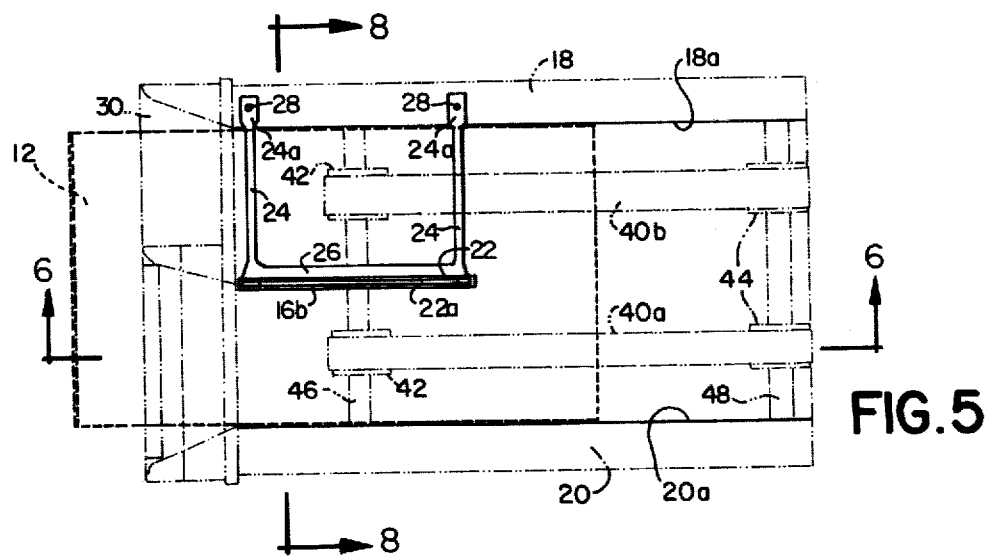
FIG. 5 is a view similar to FIG. 1 showing a larger width document being inserted.
Figure 6:
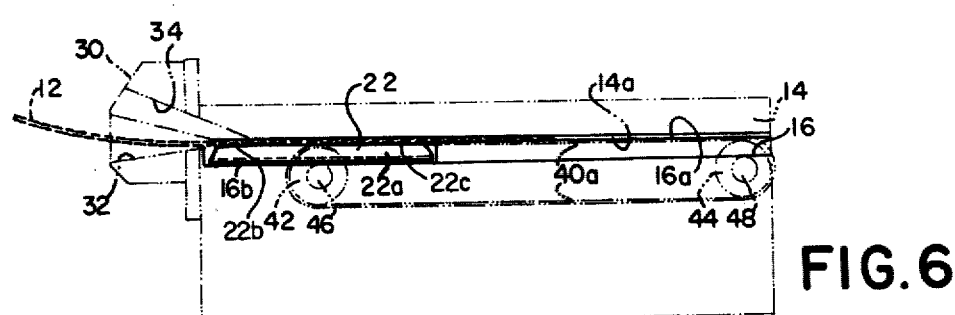
FIG. 6 is a sectional view taken along 6—6 of FIG. 5.

Intermediate the walls 18a and 20a is a moveable wall structure 22 typically, but not necessarily composed of sheet metal having surface 22a opposed to and generally parallel to edge wall 20a and together with that edge wall 20a defining the width dimension of second documents which will be accommodated. As seen in FIG. 1, the width of document 10 fits snugly between walls 20a and 22a. Whereas as seen in FIG. 5, the edges of document 12 fits snugly between walls 18aand 20a. Because the narrower document 10 is in the position shown in FIG. 1, its adjacent edge will be guided by wall 22a and the document will not tend to deflect or move member wall 22 in any way. However, wall member 22 is supported by resilient means, in this case integral sheet metal, parallel arms 24 best seen in FIGS. 1 and 5. The integral generally U-shaped sheet metal member has a base member 26 in the same plane and joined to the arms 24. The remote bottom edge of base member 26 is bent at right angles to the overall plane of the arms 24 along the length of member 26 to provide the flange 22 which provides wall 22a. Enlarged portions 24a of the arms 24 remote from wall 22 are fixed by suitable fastening means 28 to a portion of the bottom wall 16 such that the arms 24 are free to flex down and away from the wall in the position shown in FIG. 6, as contrasted with the position of FIG. 2, so that the wall 22 assumes a position detailed in FIG. 6A in solid lines. As paper 12 passes over the top of the movable wall, as shown in FIG. 6, it first gains access between the tapered top edge 22b, and then begins to move wall member 22 away from top wall surface 16a, until it reaches the top plate wall edge 22c which normally rests against the top wall 14a at which point the paper has depressed the wall 22 a maximum amount. When paper 12 passes beyond the wall 22, the resilient arms 24 will urge the wall 22 back against the top wall 14a. It will be appreciated that the flange forming movable wall 22, as seen in FIGS. 2 and 6, must be wide enough (or deep enough) to pass through bottom wall 16, and preferably through a closely confining elongated slot 16b therein.

Figures 3, 4:
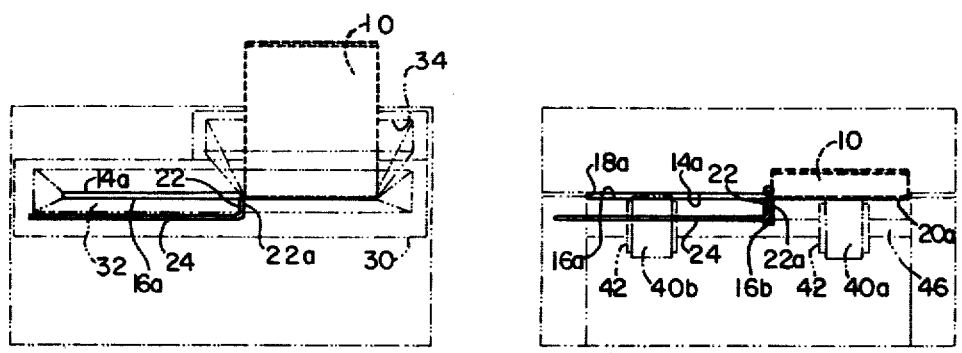
FIG. 3 is a front elevational view of the device of FIGS. 1 and 2.
FIG. 4 is a sectional view taken along line 4—4 of FIG. 1.
Figure 7:
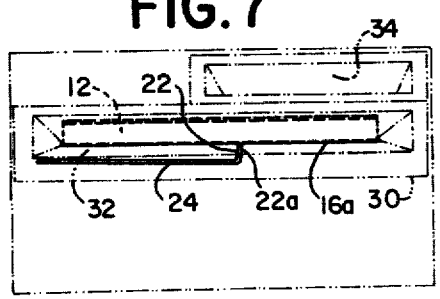
FIG. 7 is an end elevational view from the ticket insertion end of the device accepting the larger ticket shown in FIG. 5.
Figure 8:
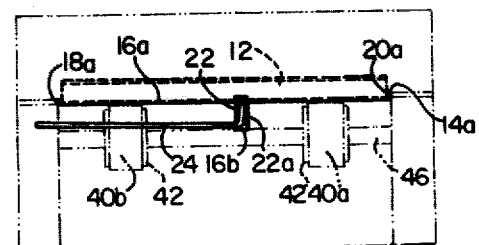
FIG. 8 is a sectional view taken along line 8—8 of FIG. 5.
Figure 6A:
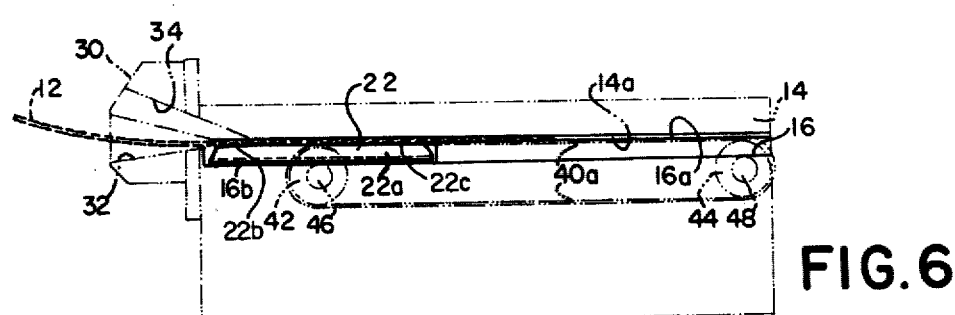
FIG. 6A is an enlarged partial view of a portion of the movable wall with a document passing.

Aiding guidance into their respective channels between walls 18a and 20a and between walls 22a and 20a is a document receiving front piece 30 having two access slots best seen in FIGS. 3 and 7. The lower wider slot forming structure 32 tapers down to at least approximately the thickness between walls 14a and 16a from a much wider width at the front opening and tapers down from a wider width to at least approximately the width of the spacing between walls 18a and 20a. Thus, when a wider document 12 is inserted in this guide slot, it will be directed into the wider channel so that it automatically passes over and depresses the movable wall 22, as shown in FIG. 6A.

It will be seen that a narrower slot 34 is provided above and to one side of the slot 32. The walls, in this case, as in the case of slot 32, taper down to the thickness between walls 14a and 16a. They do it, however, in a downward descending direction moving the paper tangentially somewhat into the channel. The width of the slot tapers down to the space between walls 20a and 22a and the position of the slot is such that the narrower document 10 is guided to a position between these two walls. More importantly, as seen in FIG. 2, the guide slot 34 has access to the narrow guide channel after the beginning of the movable wall 22 so that the document 10 is guided into the channel along the side of the moveable wall 22a, and preferably across the boundary between wall 22 and top wall 16a to minimize any tendency to pass between them.

Conveyor means must also be provided to grasp documents inserted into the conveying channel and move them into the apparatus in position such that an edge is aligned with wall 20a whereby they are in proper position to be read by suitable readers or printed by suitable printers or otherwise processed in accordance with the particular application involved. In the showing illustrated, a pair of endless belt conveyor means 40a and 40b which may be, for example, timing belts are driven by suitable drive pulleys 42a and 42b over suitable idling pulleys 44a and 44b. Pulleys 42a dn 42b are supported by and driven by a common drive axle 46 suitable mounted in bearing on support and provided with a conventional drive means. Idler pulleys 44a and 44b are mounted on a common shaft 48 so that they also tend to rotate together in suitable bearings provided by the housing. The belt 48 preferably is of sufficient width to provide a satisfactory frictional grip on a narrow document of the second width inserted between walls 20a and >a and to continue it on the path initiated by those channel walls. Drive belt 48 projects sufficiently above the bottom wall 16a to properly engage the document in this position and extends through a suitable slot in wall 16. Similarly, belt 40b assumes the similar orientation slightly above wall 16a through a suitable slot parallel to that accommodating drive belt 40a and approximately midway between wall 18a and wall 22 so that wider documents of the first type between walls 18a and 20a are drawn through by parallel belts. Of course, a single belt 40a may be sufficient in a given case, particularly since the walls 18a and 20a tend to preserve alignment of the document. The belts themselves are intended to be simply representative of any state of the art type of conveyor that might be used in this application, and it will be understood that other types of drives may be readily substituted, that the drive belts may be used alone as shown or in combination with rollers or pulleys or opposed drive belt where the design mix is appropriate.

The structure shown in these drawings is an extremely simple form of the present invention, but it will be understood that the present invention relates to a movable wall which may have access from the top and extend into contact with the bottom wall as well as being provided in the orientation shown. Furthermore, the resilient means can assume many forms in order to urge the movable wall into contact with the top or bottom wall, the wall opposite the one through which it passes to gain access to the document channel. While reference is made to top and bottom walls, it will be understood that these walls may have any orientation, and, for example, may be vertically oriented or have major vertical components.

Although reference has been made to apparatus having one movable wall for a common document of two widths, it will be clear to those skilled in the art that two or more walls of this type could be employed to accommodate three or more widths of documents such that, for example, a document of the third intermediate width would be introduced by guide means which would put it in position to depress the first movable wall but not the second movable wall and rather be guided by the second movable wall and one of the fixed channel walls.

Many other modifications to and variations upon the invention disclosed herein will occur to those skilled in the art. All such modifications and variations within the scope of the claims are intended to be within the scope and spirit of the present invention.

I claim:

1. In a document handling device wherein position of the document is sensitive and at least two widths of document must be handled, the improvement comprising:
   - a conveyor channel having upper and lower walls and lateral walls defining means at fixed width to align documents of a first width fitting snugly within the lateral walls;
   - at least one movable divider wall means extending through one of the upper or lower walls and into contact with the other, over a distance large in comparison to channel thickness and having a channel defining wall surface spaced from a lateral wall defining means in order to accept and align narrower documents of a second width fitting snugly therebetween, said divider wall having a tapering leading edge in the direction of document movement over the wall providing a decreasing space between the wall with which it is in contact away from the document insertion end of the channel,
   - resilient means urging the movable divider wall into the wall with which it makes contact and yielding to documents passing over the leading tapered edge of the movable wall; and
   - conveyor means to engage a document inserted into the channel and pull the document through the channel while maintaining position of the document relative to at least one lateral wall defining the channel.

2. The document handling device of claim 1 in which insert guide means is provided at least for the narrower documents to guide them into the space within the movable under walls at a point beyond the front edge of said movable wall without moving said movable wall.

3. The document handling device of claims 1 or 2 in which insert guide means is provided for documents of both the first and second widths but that the guide means for the documents of the second width is located above the guide means for the first width. Each of the guide means providing a tapering slot which tapers down to approximately the width of the space between the upper and lower walls of the conveyor channel and from a width somewhat wider than the guide channel to the approximate width of the space between the lateral walls defined in each channel prescribed width.

4. The document handling device of claim 1 in which the resilient means urging the movable divider wall into the wall with which it makes contact is integral with the movable divider wall and fixed to the housing structure to permit relative movement.

5. The document handling device of claim 4 in which the movable guide wall and resilient means is formed of an integral U-shaped piece and the bottom of the U-shaped member being bent along its length to provide the wall as a flange generally perpendicular to the base of the U and the structure being fixed to the wall at remote positions along their respective opposite arms causes the wall to yield under pressures applied to the wall and resiliently urges the movable wall into contact with the wall with which it makes contact.

6. The document handling device of claim 1 in which the movable wall extends through the wall opposite the one into which it is urged by resilient means and the resilient means are supported by said opposite wall.

* * * * *